(12) United States Patent
Shimomugi et al.

(10) Patent No.: US 10,003,184 B2
(45) Date of Patent: Jun. 19, 2018

(54) BACKFLOW PREVENTING DEVICE, POWER CONVERSION DEVICE, AND REFRIGERATION AIR-CONDITIONING APPARATUS

(71) Applicant: Mitsubishi Electric Corporation, Tokyo (JP)

(72) Inventors: Takuya Shimomugi, Tokyo (JP); Koichi Arisawa, Tokyo (JP); Takashi Yamakawa, Tokyo (JP); Keisuke Uemura, Tokyo (JP); Shinsaku Kusube, Tokyo (JP); Kenta Yuasa, Tokyo (JP); Akihiro Tsumura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 304 days.

(21) Appl. No.: 14/780,036

(22) PCT Filed: Mar. 18, 2014

(86) PCT No.: PCT/JP2014/057212
§ 371 (c)(1),
(2) Date: Sep. 25, 2015

(87) PCT Pub. No.: WO2014/156792
PCT Pub. Date: Oct. 2, 2014

(65) Prior Publication Data
US 2016/0049783 A1    Feb. 18, 2016

(30) Foreign Application Priority Data

Mar. 27, 2013  (JP) .................... PCT/JP2013/058935

(51) Int. Cl.
*F25B 49/00*     (2006.01)
*H02P 6/04*      (2016.01)
(Continued)

(52) U.S. Cl.
CPC ............ *H02H 3/003* (2013.01); *H02M 3/158* (2013.01); *H02M 1/4225* (2013.01);
(Continued)

(58) Field of Classification Search
CPC ........... H02H 3/003; H02M 2001/0051; Y02B 70/1491
(Continued)

(56) References Cited

U.S. PATENT DOCUMENTS

| | | | | |
|---|---|---|---|---|
| 4,326,234 A | * | 4/1982 | Shuey | H01H 47/325 361/154 |
| 5,088,017 A | * | 2/1992 | Yaginuma | H02J 1/102 363/21.04 |

(Continued)

FOREIGN PATENT DOCUMENTS

| | | |
|---|---|---|
| EP | 2 071 714 A1 | 6/2009 |
| EP | 2 523 338 A1 | 11/2012 |

(Continued)

OTHER PUBLICATIONS

Extended European Search Report dated Nov. 28, 2016 in the corresponding EP application No. 14775828.8.
(Continued)

*Primary Examiner* — Henry Crenshaw
(74) *Attorney, Agent, or Firm* — Posz Law Group, PLC

(57) ABSTRACT

A backflow preventing device includes a backflow preventing element connected between a power source and a load, for preventing a backflow of a current from the load side to the power source side, a commutation device configured to perform a commutation operation of causing a current to flow through an other path connected in parallel to the backflow preventing element, and a controller configured to change a pulse width of a commutation drive signal for controlling the commutation device to perform the commu-
(Continued)

tation operation based on a current flowing through the backflow preventing element, and transmitting the commutation drive signal having the changed pulse width to the commutation device. The controller transmits the pulse to the commutation device only for a necessary time period so that the commutation device performs the commutation operation, to thereby reduce electric power relating to the commutation operation not contributing to the power conversion.

15 Claims, 11 Drawing Sheets

(51) Int. Cl.
- *H02M 3/335* (2006.01)
- *H02M 1/12* (2006.01)
- *H02H 3/00* (2006.01)
- *H02M 3/158* (2006.01)
- *H02M 1/42* (2007.01)
- *H02M 1/00* (2006.01)
- *H02M 1/34* (2007.01)

(52) U.S. Cl.
CPC .............. *H02M 2001/0051* (2013.01); *H02M 2001/342* (2013.01); *Y02B 70/126* (2013.01); *Y02B 70/1491* (2013.01)

(58) Field of Classification Search
USPC ......... 318/400.01, 400.03; 363/21.04, 41, 89
See application file for complete search history.

(56) References Cited

U.S. PATENT DOCUMENTS

| | | | | |
|---|---|---|---|---|
| 5,825,145 A | * | 10/1998 | Pham | H02P 6/34 318/400.01 |
| 6,108,221 A | * | 8/2000 | Takada | H02M 1/4216 323/207 |
| 2007/0126289 A1 | * | 6/2007 | Liu | H05B 37/0263 307/119 |
| 2008/0080219 A1 | * | 4/2008 | Sohma | H02M 3/1588 363/89 |
| 2008/0297959 A1 | * | 12/2008 | Tanabe | H02P 6/182 361/33 |
| 2011/0227640 A1 | * | 9/2011 | Kyono | H02H 3/18 327/581 |
| 2011/0248012 A1 | * | 10/2011 | Fujiwara | B23K 9/092 219/137 PS |
| 2012/0066895 A1 | * | 3/2012 | Tsuda | A61B 5/055 29/602.1 |
| 2013/0241516 A1 | * | 9/2013 | Ueno | G05F 1/618 323/285 |
| 2013/0342139 A1 | * | 12/2013 | Shimomugi | H02M 7/066 318/400.3 |

FOREIGN PATENT DOCUMENTS

| | | |
|---|---|---|
| JP | S59-117459 A | 7/1984 |
| JP | 2005-160284 A | 6/2005 |
| JP | 2011-172485 A | 9/2011 |
| JP | 2012-070580 A | 4/2012 |
| JP | 2012-231646 A | 11/2012 |
| WO | 2012/042579 A1 | 4/2012 |
| WO | 2012/104889 A1 | 8/2012 |
| WO | 2012/120600 A1 | 9/2012 |
| WO | 2012/137258 A1 | 10/2012 |

OTHER PUBLICATIONS

Japanese Office Action dated Nov. 1, 2016 in the corresponding JP application No. 2015-508331.
International Search Report of the International Searching Authority dated Jun. 10, 2014 for the corresponding international application No. PCT/JP2014/057212.
Yagihara et al., "The Characteristic Evaluation of Recovery Assist Boost Chopper", IEEE Japan, Jan. 25, 2013, pp. 27-32.
Chinese Office Action of Mar. 24, 2017 in the corresponding CN application No. 201480016244.7.
The Second Office Action issued by The State Intellectual Property Office of People's Republic of China dated Sep. 30, 2017 in the corresponding Chinese patent application No. 201480018244.7.

* cited by examiner

COMMUTATION DRIVE SIGNAL

F I G. 2 0
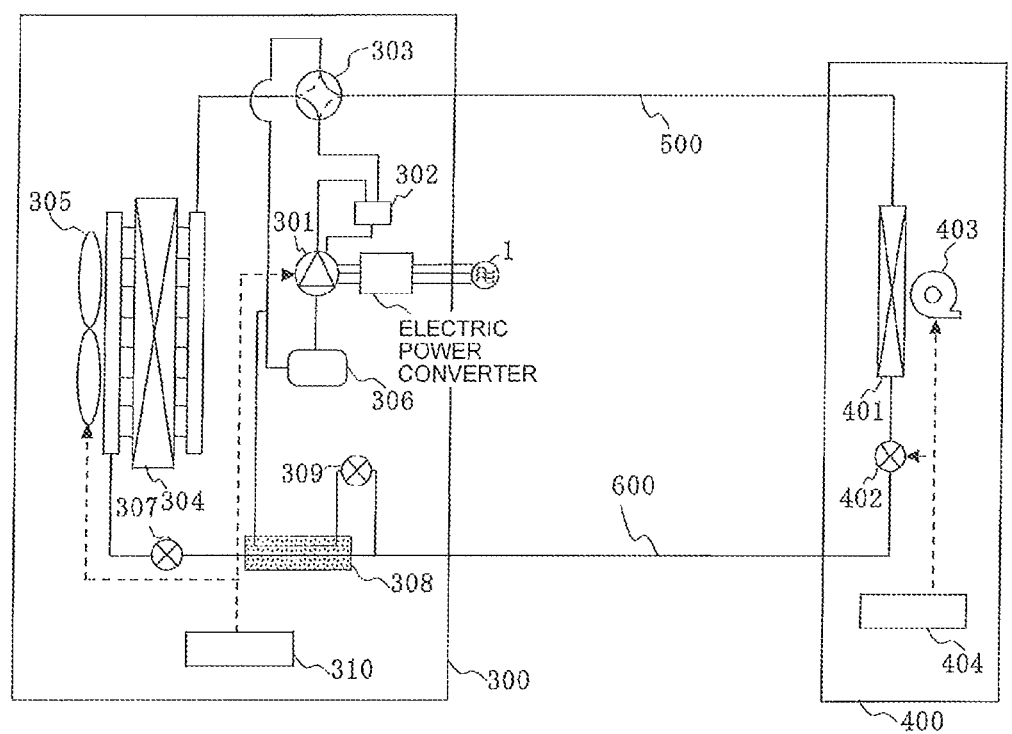

BACKFLOW PREVENTING DEVICE, POWER CONVERSION DEVICE, AND REFRIGERATION AIR-CONDITIONING APPARATUS

CROSS REFERENCE TO RELATED APPLICATION

This application is a U.S. national stage application of International Application No. PCT/JP2014/057212 filed on Mar. 18, 2014, which claims priority to International Application No. PCT/JP2013/058935 filed on Mar. 27, 2013, the disclosures of which are incorporated herein by reference.

TECHNICAL FIELD

The present invention relates to, for example, a backflow preventing device included in a power conversion device and other apparatus.

BACKGROUND ART

Along with increased practical uses of variable voltage variable frequency inverter devices and other devices, application fields of various kinds of power conversion device have been developed.

For example, technologies applied to a boost/buck converter have been actively developed for a power conversion device in recent years. Meanwhile, wide band-gap semiconductor elements and other elements containing silicon carbide or other materials as its material have also been actively developed. In regard to such novel elements, elements having a high breakdown voltage but a small current capacity (permissible current effective value) have been put into practical use mainly for rectifiers (see, for example, Patent Literature 1).

CITATION LIST

Patent Literature

Patent Literature 1: Japanese Unexamined Patent Application Publication No. 2005-160284 (FIG. 1)

SUMMARY OF INVENTION

Technical Problem

Meanwhile, the practical use of novel highly efficient elements, such as elements having a large current capacity, is accompanied by a large number of challenges in terms of high cost, crystal defects, and other such problems, and it is considered that it will take some time before such elements become widespread. Accordingly, it is difficult at present to use such a novel element to achieve high efficiency of a power conversion device for converting electric power higher than electric power to be supplied to a motor, for example, of a compressor of an air-conditioning apparatus.

The present invention has been made in view of the above-mentioned problem, and provides a backflow preventing device and the like, which are capable of securing high efficiency, high reliability, and others. The present invention is also aimed at further reducing a loss due to power conversion.

Solution to Problem

According to one embodiment of the present invention, there is provided a backflow preventing device, including a backflow preventing element connected between a power source and a load, for preventing a backflow of a current from the load side to the power source side, a commutation device for performing a commutation operation of causing a current to flow through an other path connected in parallel to the backflow preventing element, and a controller configured to determine a time period for performing the commutation operation, and control the commutation device to perform the commutation operation based on the determined time period.

Advantageous Effects of Invention

According to the backflow preventing device in the one embodiment of the present invention, the commutation device capable of performing the commutation operation is provided, and hence a current attempting to flow through the backflow preventing element may be commutated to the other path, to thereby reduce a recovery current generated in the backflow preventing element when the current flows reversely from the load side. Consequently, a reduction in loss, a reduction in level of noise terminal voltage, measures for EMC, and other advantages may be achieved to increase the efficiency in the system as a whole. In this case, the time period for performing the commutation operation is determined, and then the commutation device is controlled to perform the commutation operation, and hence the commutation operation may be performed only for a time period necessary for the commutation operation. Consequently, electric power relating to the commutation operation not contributing to power conversion may be reduced to save energy.

BRIEF DESCRIPTION OF DRAWINGS

FIG. 20 is a configuration diagram of a refrigeration air-conditioning apparatus according to Embodiment 9 of the present invention.

DESCRIPTION OF EMBODIMENTS

Now, a power conversion device and the like according to embodiments of the present invention are described with reference to the drawings. In the following drawings, including FIG. 1, the same or corresponding parts are denoted by the same reference symbols, which is common to the entire contents of the following embodiments. Then, the modes of components described herein are merely illustrative, and are not intended to be limited to those described herein.

Embodiment 1

Figure 1:
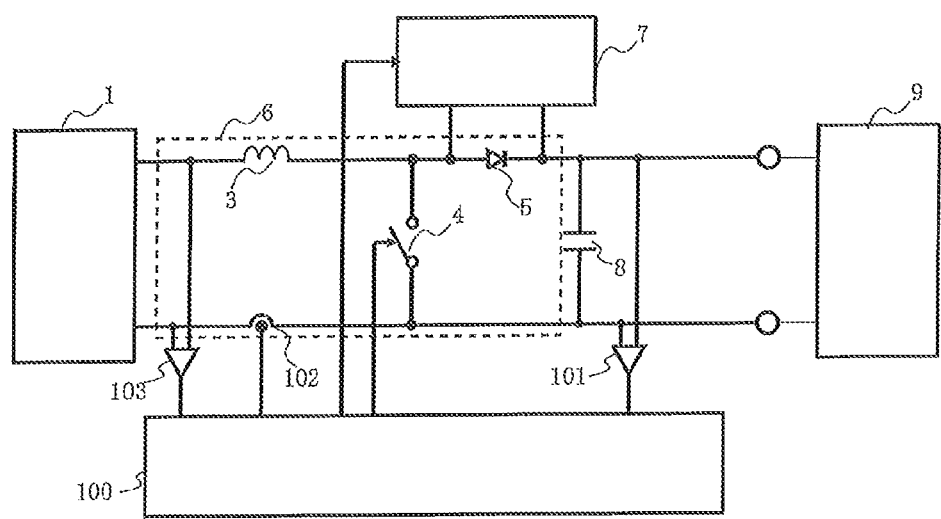
FIG. 1 is a diagram illustrating a system configuration mainly including a power conversion device according to Embodiment 1 of the present invention.

FIG. 1 is a diagram illustrating an example of a system configuration and other configurations mainly including a power conversion device according to Embodiment 1 of the present invention. First, a description is given of the system configuration illustrated in FIG. 1 including the power conversion device capable of performing highly efficient power conversion.

In the system of FIG. 1, the power conversion device is provided between a power source 1 and a load 9, and converts electric power from the power source 1 to supply the converted electric power to the load 9. The power conversion device in this embodiment performs boosting, and includes, for example, a chopper circuit 6, a commutation device 7, and a smoothing device 8.

Figure 2:
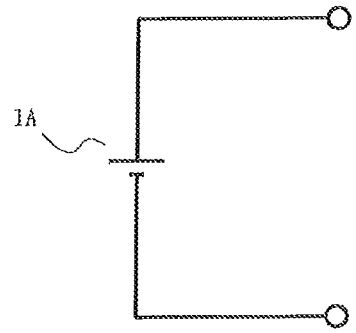
FIG. 2 is a diagram (first example) illustrating a configuration of a power source 1.
Figure 3:
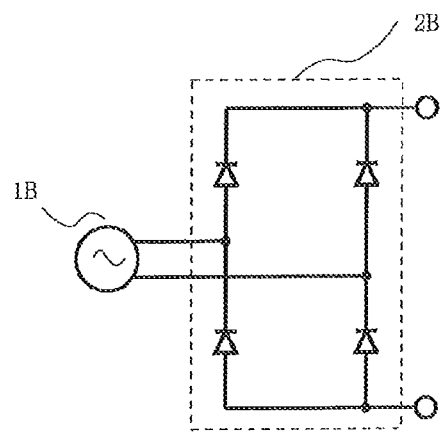
FIG. 3 is a diagram (second example) illustrating a configuration of the power source 1.
Figure 4:
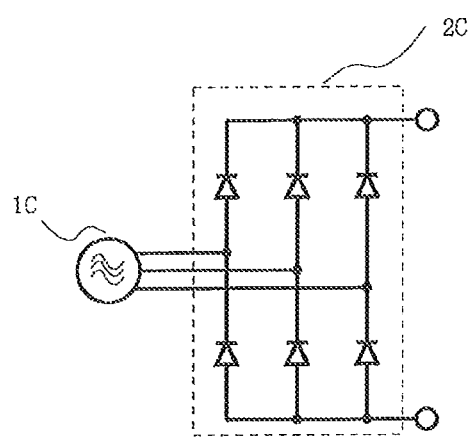
FIG. 4 is a diagram (third example) illustrating a configuration of the power source 1.

FIG. 2 to FIG. 4 are diagrams illustrating configurations of the power source 1. FIG. 2 is a diagram of the power source 1 constructed with a DC power source 1A. FIG. 3 is a diagram of the power source 1 constructed with a single-phase AC power source 1B and a rectification circuit (rectification device) 2B. FIG. 4 is a diagram of the power source 1 constructed with a three-phase AC power source 1C and a rectification circuit (rectification device) 2C. Each of the rectification circuits 2B and 2C is constructed with bridge-connected rectification elements such as diodes, and rectifies electric power supplied from the power source 1. In this manner, the power conversion device in this embodiment can deal with various types of the power source 1.

The chopper circuit 6 includes a reactor 3, a short-circuit device (switch device) 4, and a backflow preventing element 5. The reactor 3 is connected on the power source 1 side, and is provided to suppress harmonic waves. Further, the short-circuit device 4 includes a switching element, such as an insulated gate bipolar transistor (IGBT). The short-circuit device 4 short-circuits the power source 1 (between two terminals connected to the power source 1) via the reactor 3 based on a drive signal (short-circuit drive signal) transmitted from a controller 100.

The backflow preventing element 5 is an element for preventing the backflow of a current supplied from the smoothing device 8 between the short-circuit device 4 and the smoothing device 8. In general, the backflow preventing element 5 is a semiconductor element as exemplified by a fast recovery diode, which has excellent electrical characteristics (in particular, recovery characteristics), has a small current capacity, and takes a short time to complete reverse recovery. Further, the commutation device 7 is a device connected in parallel to the backflow preventing element 5. Then, the commutation device 7 commutates the current flowing through the backflow preventing element 5 to a different path (path not via the backflow preventing element 5) at a necessary timing. The backflow preventing element 5 and the commutation device 7 construct a backflow preventing device for preventing the backflow of the current from the load 9 side to the power source 1 side.

Figure 5:
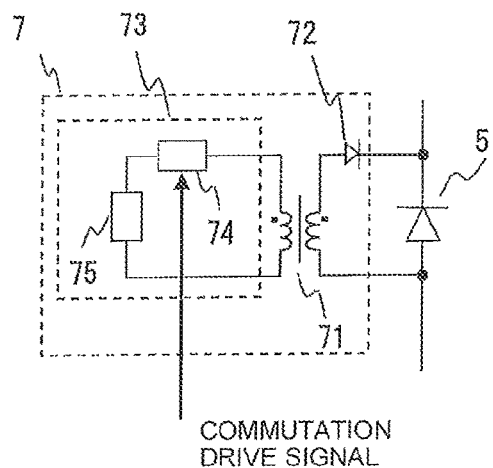
FIG. 5 is a diagram illustrating an example of a configuration in which a commutation device 7 is connected in parallel to a backflow preventing element 5 according to Embodiment 1 of the present invention.

FIG. 5 is a diagram illustrating an example of the configuration in which the commutation device 7 is connected in parallel to the backflow preventing element 5 according to Embodiment 1 of the present invention. In FIG. 5, the commutation device 7 includes, for example, a transformer 71, a commutation rectification element 72 such as a diode connected in series to a secondary-side winding of the transformer 71, and a transformer drive circuit 73 for operating the transformer 71. Further, the transformer drive circuit 73 includes, for example, a commutation power source 75 for supplying electric power to the transformer 71, and a commutation switch 74, which is configured to be opened or closed based on a drive signal (commutation drive signal) transmitted from the controller 100, for controlling the supply of electric power to the transformer 71 (primary-side winding) and the stop of the supply. The commutation rectification element 72 is also constructed with a semiconductor element as exemplified by a fast recovery diode.

For the commutation rectification element 72, a Schottky barrier diode having good recovery characteristics, a low forward voltage, and a high breakdown voltage with a small loss may be used. Alternatively, a wide band-gap semiconductor element containing silicon carbide (SiC), gallium nitride (GaN), or diamond as its material may be used. When such element has a larger permissible current effective value according to its specifications, crystal defects are increased and the cost is increased. An element having a small permissible current effective value can be used for the commutation rectification element 72 in this embodiment, and hence the power conversion device with high cost performance and high efficiency can be realized.

Further, the backflow preventing element 5, the secondary-side winding of the transformer 71, and the commutation rectification element 72 can be insulated from the transformer drive circuit 73 and the controller 100 because the transformer 71 is interposed therebetween. Consequently, a signal for driving the commutation device 7 can be injected relatively easily. Further, the system with high safety and high reliability can be constructed.

In this case, in FIG. 5, the example in which the secondary-side winding of the transformer 71 and the anode side of the commutation rectification element 72 are connected to each other is illustrated, but the present invention is not limited to such connection as long as the direction of a current flowing through the commutation rectification element 72 is not changed. For example, the cathode side of the commutation rectification element 72 may be connected to the secondary-side winding of the transformer 71. Further, the transformer drive circuit 73 is constructed with the commutation switch 74 and the commutation power source 75, but a limiting resistor, a high frequency capacitor, a snubber circuit, a protective circuit, or other circuits may be inserted as necessary into the electrical circuit constructed with the commutation power source 75, the commutation switch 74, and the primary-side winding of the transformer 71 in consideration of noise countermeasures and protection in case of failure. In addition, a reset winding may be added as necessary to the primary-side winding of the transformer 71 to reset an excitation current. In addition, a rectifier or other circuits may be provided so that excitation energy may be regenerated on the power source side to increase the efficiency.

The smoothing device 8 is constructed with use of a capacitor, for example. The smoothing device 8 smoothes a voltage applied from the power source 1, and applies a DC voltage (output voltage, bus voltage) to the load 9 to supply electric power to the load 9. The load 9 is driven with the electric power supplied via the smoothing device 8.

Further, a load voltage detection unit 101 is a voltage detector for detecting the voltage smoothed by the smoothing device 8 and applied to the load 9, and outputting a voltage detection value as a detection signal. A current detection unit 102 is a current detector for detecting a current (bus current) flowing from the power source 1, and outputting a current detection value as a detection signal. A current flowing through the reactor 3 can be detected based also on the current detection value of the current detection unit 102. Then, a power source voltage detection unit 103 is a voltage detector for detecting the voltage applied from the power source 1, and outputting a voltage detection value as a detection signal.

The controller 100 is a device for performing processing of calculating an operating time period (short-circuit time period) of the short-circuit device 4, the commutation device 7, and other devices based on the detection signals of the load voltage detection unit 101, the current detection unit 102, and the power source voltage detection unit 103. The controller 100 includes an arithmetic unit such as a microcomputer and a digital signal processor including a processing device such as a CPU, a storage device, and other components, or a device having an internal function similar to the arithmetic unit.

Figure 6:
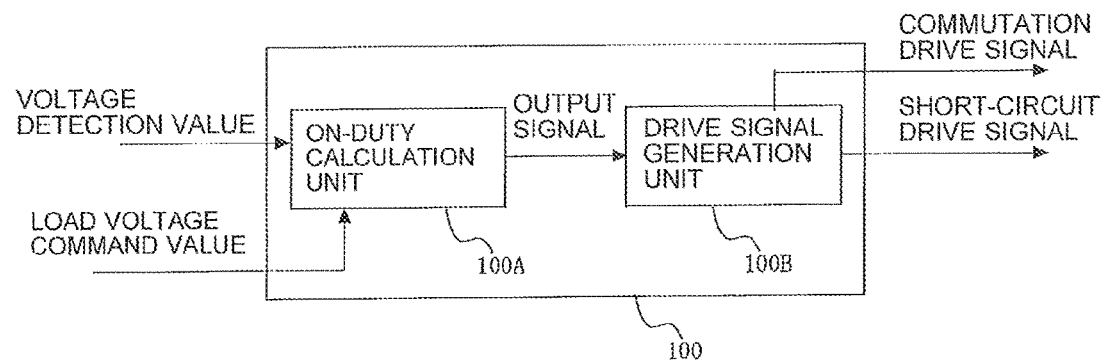
FIG. 6 is a diagram illustrating an example of a block configuration of control functions of a controller 100 according to Embodiment 1 of the present invention.

FIG. 6 is a diagram illustrating an example of a block configuration of control functions of the controller 100 according to Embodiment 1 of the present invention. In FIG. 6, an on-duty calculation unit 100A calculates an on-duty of the short-circuit device 4 based on, for example, a voltage detection value and a load voltage command value relating to the detection by the load voltage detection unit 101, and transmits an output signal (on-duty signal). In this case, the on-duty calculation unit 100A calculates the on-duty based on the voltage detection value and the load voltage command value relating to the detection by the load voltage detection unit 101, but the present invention is not limited thereto. For example, the on-duty calculation unit 100A may calculate the on-duty based on a current detection value and a current command value relating to the detection by the current detection unit 102. Alternatively, the on-duty calculation unit 100A may calculate the on-duty based on a voltage detection value and a load voltage command value relating to the detection by the power source voltage detection unit 103. Further, the on-duty calculation unit 100A may calculate the on-duty based on a combination of the respective values relating to the current and the voltage.

A drive signal generation unit 100B generates drive signals for the short-circuit device 4 and the commutation device 7 based on the output signal from the on-duty calculation unit 100A, and transmits the generated drive signals to the short-circuit device 4 and the commutation device 7, respectively.

The operation relating to the system in this embodiment as described above is described below. The power conversion device in this embodiment adds the commutation operation of the commutation device 7 to a power conversion operation of a DC chopper, for example. In this manner, the backflow preventing element 5 performs reverse recovery before the current flows reversely from the smoothing device 8, to thereby reduce a recovery current.

Figure 7:
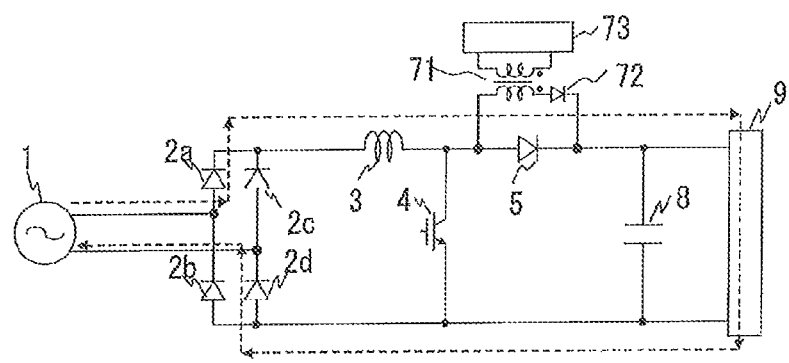
FIG. 7 is a diagram illustrating an example (first example) of a current path according to Embodiment 1 of the present invention.
Figure 8:
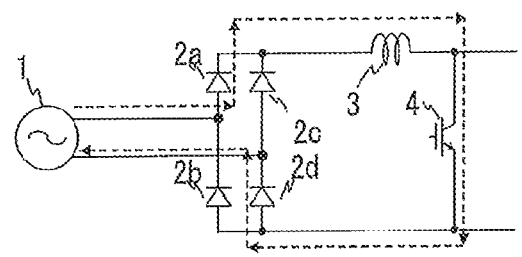
FIG. 8 is a diagram illustrating an example (second example) of the current path according to Embodiment 1 of the present invention.
Figure 9:
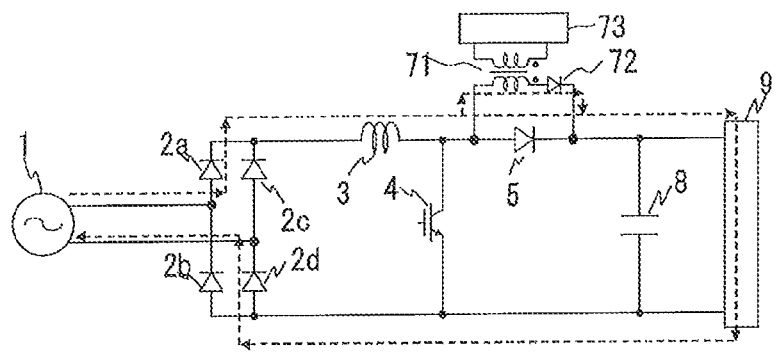
FIG. 9 is a diagram illustrating an example (third example) of the current path according to Embodiment 1 of the present invention.

FIG. 7 to FIG. 9 are diagrams illustrating examples of the current path according to Embodiment 1 of the present invention. FIG. 7 to FIG. 9 are illustrations of the paths in representative operation examples among the combination of the open/close states of the short-circuit device 4 and the commutation switch 74 included in the commutation device 7. Referring to FIG. 7 to FIG. 9, the operation of the power conversion device in this embodiment is described. In the following, the power source 1 is constructed with the combination of the single-phase AC power source 1B and the rectification circuit 2B as illustrated in FIG. 3. Further, as illustrated in FIG. 7 to FIG. 9, the rectification circuit is constructed with rectification elements 2a to 2d.

FIG. 7 is an illustration of the state in which the short-circuit device 4 is off (opened) and the commutation switch 74 is off. When the power conversion device is operated in the state in which the short-circuit device 4 and the commutation switch 74 are maintained to be off, the formed circuit is equivalent to a simple full-wave rectification circuit. For example, one of the terminals of the power source 1 connected to the rectification elements 2a and 2b has a higher potential, the current path is formed from the power source 1 to the rectification element 2d via the rectification element 2a, the reactor 3, the backflow preventing element 5, and the load 9 in the stated order.

FIG. 8 is an illustration of the state in which the short-circuit device 4 is on (closed) and the commutation switch 74 is off. In this case, a short-circuit current flows through the path from the power source 1 to the rectification element 2d via the rectification element 2a, the reactor 3, and the short-circuit device 4 in the stated order. The voltage applied to the reactor 3 is substantially the same as the voltage of the power source 1.

For example, in the full-wave rectification as illustrated in FIG. 7, the section in which the smoothing device 8 is discharged to cause a current to flow through the load 9 has a section in which the input current of the power source 1 is disconnected. However, when the short-circuit device 4 is turned on, the short-circuit current flows via the reactor 3 as illustrated in FIG. 8, and hence the input current of the power source 1 flows even in the current-disconnected section as described above. Accordingly, when the short-circuit device 4 is repeatedly switched on and off, the current paths illustrated in FIG. 7 and FIG. 8 can be repeatedly formed. In addition, through the control of the ratio between the on period and the off period, the waveform of the input current of the power source 1 can be arbitrarily changed to improve the power factor and the rate of content of a harmonic current.

In this case, in general, a rectifier diode has a tendency that the amount of stored carriers increases as the current capacity increases. Accordingly, when the current capacity increases, the recovery current also increases. Further, the recovery current increases as the applied reverse bias voltage becomes higher.

According to this embodiment, the reverse recovery is not performed in a manner that a high reverse bias voltage is applied to the backflow preventing element 5 having a large current capacity, but control is performed so that the reverse recovery may be performed in a manner that the commutation path is formed by the commutation device 7 and a low reverse bias voltage is applied to the backflow preventing element 5 via the transformer 71 and the commutation rectification element 72 immediately before the short-circuit device 4 is turned on (hereinafter this control is referred to as "commutation control").

In the commutation control, the commutation switch 74 of the commutation device 7 is turned on immediately before the short-circuit device 4 is turned on so that the current flowing through the backflow preventing element 5 is commutated to the commutation rectification element 72 side via the transformer 71. FIG. 9 is an illustration of the state in which the short-circuit device 4 is off and the commutation switch 74 is on. The current path in this case is formed from the power source 1 to the rectification element 2d via the rectification element 2a, the reactor 3, the backflow preventing element 5, and the load 9 in the stated order similarly to FIG. 7. In addition, the commutation switch 74 is turned on, and hence the transformer 71 is excited, and the current flows also into the path from the secondary-side winding of the transformer 71 to the commutation rectification element 72 of the commutation device 7. Then, after a predetermined period of time has elapsed, the current is completely commutated to the path on the commutation rectification element 72 side.

Figure 10:
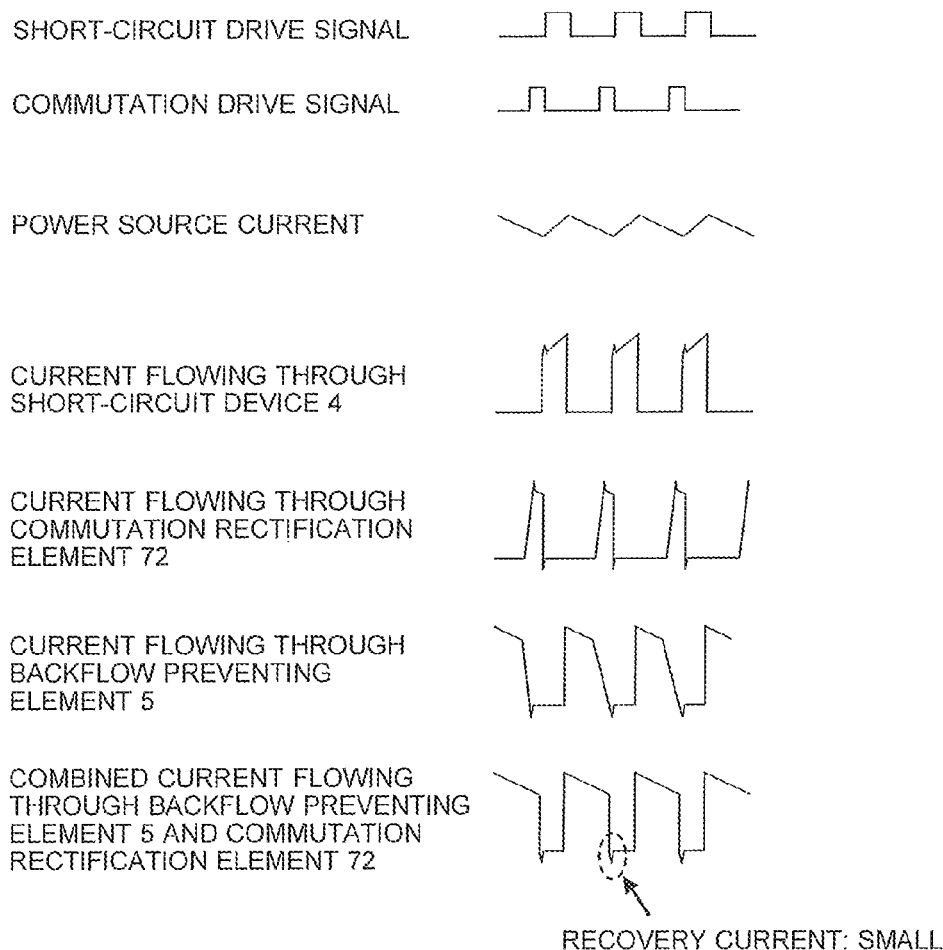
FIG. 10 is a diagram illustrating the waveforms of signals and currents at the time when the commutation device 7 is operated according to Embodiment 1 of the present invention.

FIG. 10 is a diagram illustrating the waveforms of signals and currents at the time when the commutation device 7 is operated according to Embodiment 1 of the present invention. In this case, in the drive signals for the short-circuit device 4 and the commutation device 7 (commutation switch 74), the HI side is the active direction (on direction). As illustrated in FIG. 10, the drive signal for the commutation device 7 is turned on immediately before the drive signal for the short-circuit device 4 is turned on. In this case, the current starts to flow through the path of the secondary-side winding of the transformer 71 due to the excitation current. Accordingly, the current starts to flow while branching into the respective directions of the backflow preventing element 5 and the commutation rectification element 72. After that, when the on state of the drive signal for the commutation device 7 is maintained, the current no longer flows to the backflow preventing element 5, and all the currents flow to the commutation rectification element 72 side (the commutation is completed).

In the commutation operation, the commutation power source 75 included in the transformer drive circuit 73 is set to have a value sufficiently smaller than the output voltage of the smoothing device 8. In this manner, the backflow preventing element 5 can be turned off (reverse recovery) with a low reverse bias voltage. When the short-circuit device 4 is turned on in this state, the reverse recovery operation of the commutation rectification element 72 is performed, and also in this case, the recovery current is generated. However, the current supply period for the commutation rectification element 72 is significantly shorter than that for the backflow preventing element 5. Accordingly, the effective current flowing through the commutation rectification element 72 is small, and hence the required current capacity can be reduced. Consequently, an element which stores a small amount of carriers and has a small capacity can be used, and hence the recovery current can be reduced as compared to the case where the recovery current is generated by the backflow preventing element 5 (note that, an element is selected in consideration of the peak current). As a result, the noise amount and loss caused by the recovery current can be reduced in the system as a whole. In this manner, the level of noise terminal voltage and radiation noise is reduced, and the circuit loss is suppressed. Consequently, a noise filter can be downsized to reduce the cost.

Further, any one of a drive power source (gate drive power source (not shown)) for operating the short-circuit device 4 and a power source (not shown) for the controller 100 can be shared with the commutation power source 75 of the transformer drive circuit 73. Consequently, it is not necessary to generate an additional power source, and the increase in cost can be avoided.

As described above, through the commutation operation performed by the commutation device 7, the recovery current in the backflow preventing element 5 can be reduced to reduce the loss, to thereby perform power conversion and the like with higher efficiency in the system as a whole. In this case, the commutation operation of the commutation device 7 and the excitation operation for performing the commutation operation do not directly contribute to the power conversion performed by the power conversion device, but are the loss. Thus, as the lengths of the commutation operation and the excitation operation become smaller, the electric power relating to the commutation operation becomes smaller to increase the efficiency and save more energy. The electric power relating to the commutation operation can be reduced in a manner that the commutation operation and the excitation operation are performed only for a time period required for the commutation operation.

Figure 11:
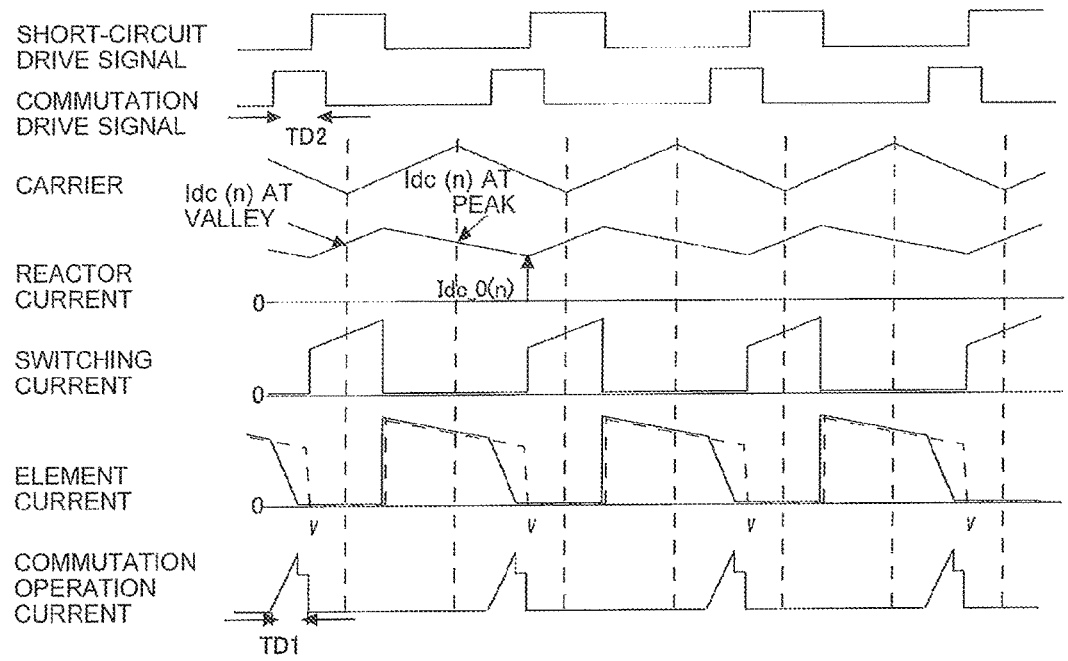
FIG. 11 is a diagram illustrating an example of the waveforms of signals and currents at the time when the commutation device 7 is operated according to Embodiment 1 of the present invention.

FIG. 11 is a diagram illustrating an example of the waveforms of signals and currents at the time when the commutation device 7 is operated according to Embodiment 1 of the present invention. As illustrated in FIG. 11, the time period during which the commutation operation is performed is the time period during which the current flows through the commutation rectification element 72 (time period represented by a commutation pulse width TD1). The time period of the commutation operation can be shortened in a manner that the commutation pulse width TD1 is reduced. Then, the controller 100 only needs to transmit the commutation drive signal having the pulse width TD2 to the commutation device 7 so that the current of the commutation pulse width TD1 may flow for the time period required for the commutation operation.

In this case, the current (reactor current) $Idc\_0(n)$ flowing through the reactor 3 is calculated to determine the minimum value (minimum time period) of the commutation pulse width TD1, which is the minimum time period required for the commutation operation. In this case, Idc_0(n) corresponds to the valley of the reactor current as illustrated in FIG. 11, and is the minimum current required to perform the commutation operation. The reactor current Idc_0(n) is calculated in this case, but it is more preferred to use a current with which the current flowing through the backflow preventing element 5 in the commutation operation can be detected or estimated.

In the period during which the short-circuit device 4 is on, the reactor current increases with an inclination ka=Vs/L, where the voltage Vs represents the voltage applied from the power source 1, and L represents the inductance of the reactor 3. On the other hand, in the period during which the short-circuit device 4 is off, the reactor current increases with an inclination kb=(Vs−Vdc)/L, where the voltage Vdc represents the voltage applied to the load 9.

Then, the controller 100 calculates Idc_0(n). In this case, the procedure of calculating Idc_0(n) differs depending on the timing of acquiring the current detection value of the current detection unit 102. For example, in the case of acquiring the current detection value Idc(n) of the current detection unit 102 in synchronization with the valley of the carrier signal, the controller 100 calculates the current detection value Idc(n) based on Expression (1). In Expression (1), Ton represents the on period of the short-circuit device 4, and Toff represents the off period of the short-circuit device 4.

[Math. 1]

$$Idc\_0(n)=Idc(n)+ka \times Tcn/2+kb \times Toff \quad (1)$$

Further, in the case of acquiring the current detection value Idc(n) of the current detection unit 102 in synchronization with the peak of the carrier signal, the controller 100 calculates the current detection value Idc(n) based on Expression (2).

[Math. 2]

$$Idc\_0(n)=Idc(n)+kb \times Toff \quad (2)$$

The minimum width of the commutation pulse width TD1 can be calculated by Expression (3). In Expression (3), Lcc represents leakage inductance in the secondary-side winding of the transformer 71. The minimum width of the commutation pulse width TD1 is calculated based on Expression (3) in this case, but may be calculated with use of other parameters as long as the commutation pulse width TD1 can be calculated.

[Math. 3]

$$TD1=Idc\_0(n) \times Lcc/Vdc \quad (3)$$

Figure 12:
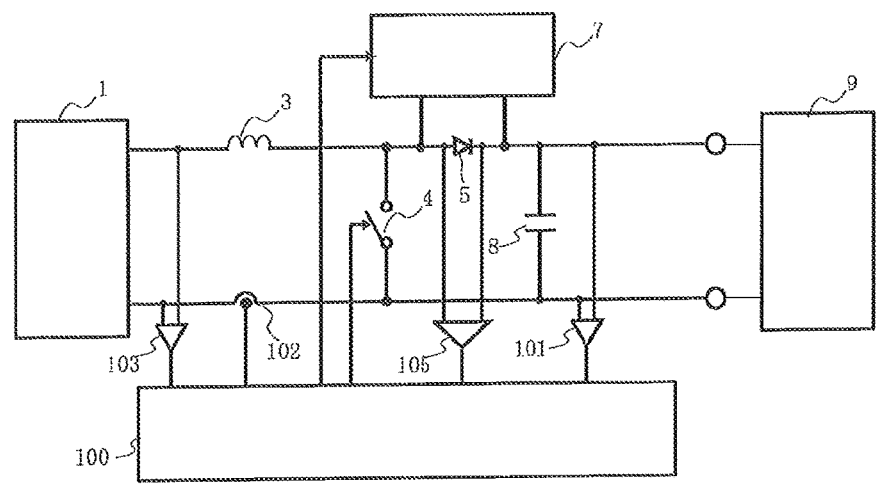
FIG. 12 is a diagram illustrating another example of the configuration of the system and the like mainly including the power conversion device according to Embodiment 1 of the present invention.

FIG. 12 is a diagram illustrating another example of a system configuration and other configurations mainly including a power conversion device according to Embodiment 1 of the present invention. In FIG. 12, the devices denoted by the same reference symbols as those in FIG. 1 perform the same operations and the like as those described in Embodiment 1. In this embodiment, the voltage Vdc expressed in Expression (3) can use a voltage detection value relating to the detection by the load voltage detection unit 101. For example, when the load voltage detection unit 101 is not provided, the voltage Vdc may be calculated based on a voltage command value and other values input to the controller 100. Further, the voltage Vdc is used in this case, but it is more preferred to use a voltage with which the voltage (inter-terminal voltage) applied to the backflow preventing element 5 can be detected or estimated. As a detection method therefor, for example, as illustrated in FIG. 12, an inter-terminal voltage detection unit 105 is connected to detect the inter-terminal voltage of the backflow preventing element 5.

Further, the leakage inductance Lcc may be stored in, for example, a storage device included in the controller 100 as numerical data in advance. In this case, the numerical value that takes the ratio of the leakage inductance to the inductance of a general transformer (for example, 0.1 of the inductance of the transformer) into consideration may be stored as the data. Further, the leakage inductance Lcc changes depending on the temperature, the current, or other parameters, data in the form of a table may be prepared, and a numerical value may be selected based on the temperature, the current, or other parameters at the time of calculation. Further, the leakage inductance Lcc is used in this case, but it is more preferred to use an inductance with which the increase rate of the current flowing through the commutation device 7 in the commutation operation can be detected or estimated.

The thus calculated minimum value of the commutation pulse width TD1 may be directly used to transmit a commutation drive signal having the pulse width TD2 (TD1=TD2), but in this case, a margin a is provided to TD1, and a commutation drive signal in which TD2=TD1+α is transmitted. This is because, for example, consideration is taken into account for characteristics fluctuations in the components of the commutation device 7 (transformer 71, commutation switch 74, commutation rectification element 72, etc.). Further, other conceivable parameters to be taken into consideration include characteristics fluctuations in the switching element included in the short-circuit device 4, and the switching speed of the switching element (fluctuations in gate resistance of the switching element, temperature characteristics thereof). For example, by utilizing the tradeoff relationship between the switching speed and the loss in the switching element, the margin a may be adjusted depending on the switching speed when the switching speed is variable depending on the load 9 or other devices.

Figure 13:
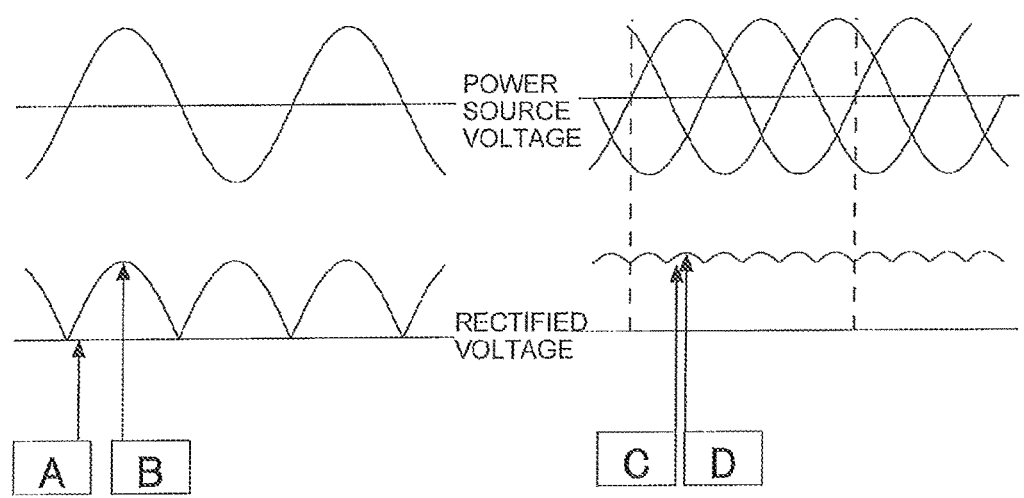
FIG. 13 is a diagram illustrating voltages obtained when an AC power source is used for a power source 1.

FIG. 13 is a diagram illustrating the voltages obtained when an AC power source is used for the power source 1. As illustrated in FIG. 13, when the power source 1 is a combination of an AC power source and a rectification circuit, the rectified voltage value differs depending on the power source phase.

Figure 14:
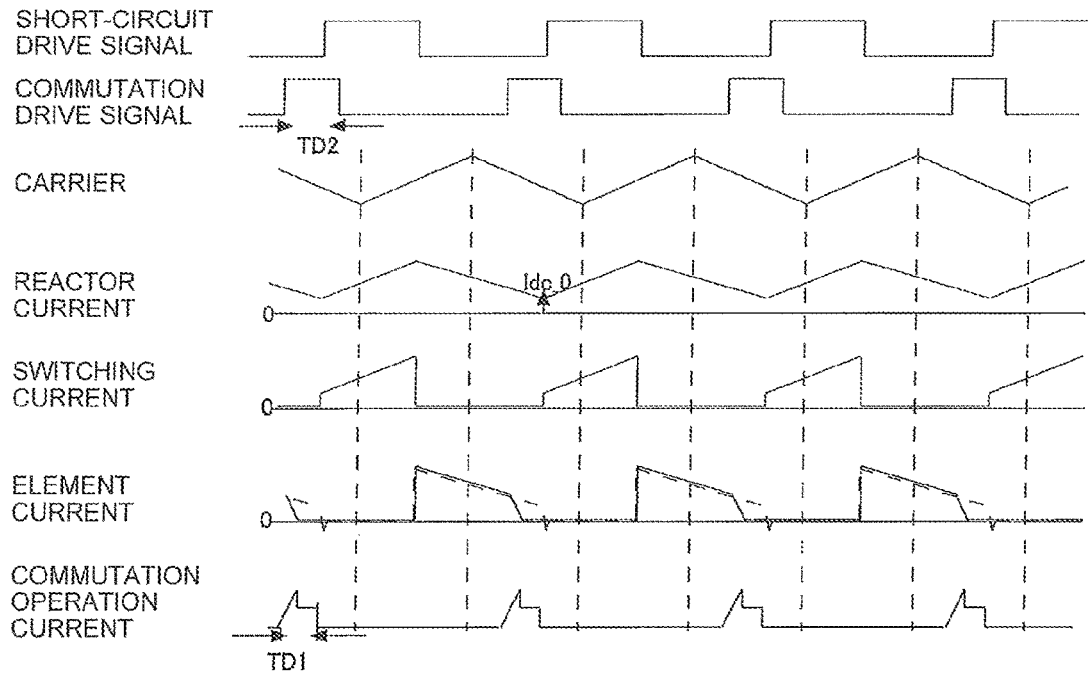
FIG. 14 is a diagram illustrating an example of the waveforms of signals and currents at the time when a power source phase is A and C of FIG. 9 according to Embodiment 1 of the present invention.

FIG. 14 is a diagram illustrating an example of the waveforms of the signals and the currents at the time when the power source phase is A and C of FIG. 13 according to Embodiment 1 of the present invention. For example, when the power source phase is A and C illustrated in FIG. 13, and when the chopper circuit 6 is operated to improve the power factor, the current flowing is reduced as illustrated in FIG. 14. Then, the recovery current flowing through the backflow preventing element 5 is reduced.

Figure 15:
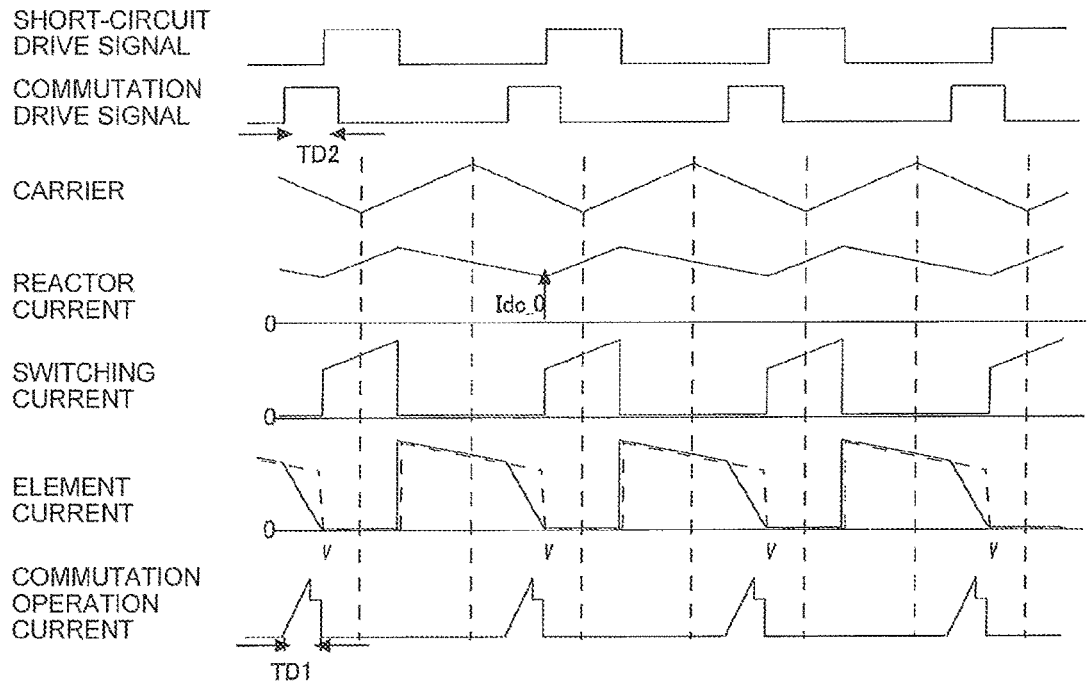
FIG. 15 is a diagram illustrating an example of the waveforms of signals and currents at the time when the power source phase is B and D of FIG. 9 according to Embodiment 1 of the present invention.

FIG. 15 is a diagram illustrating an example of the waveforms of the signals and the currents at the time when the power source phase is B and D of FIG. 13 according to Embodiment 1 of the present invention. For example, when the power source phase is B and D illustrated in FIG. 13, and when the chopper circuit 6 is operated to improve the power factor, the current flowing is increased as illustrated in FIG. 15. Then, the recovery current flowing through the backflow preventing element 5 is increased.

The boost ratio is large when the rectified voltage value is small, and the boost ratio is small when the rectified voltage value is large. Thus, which of the states of FIG. 14 and FIG. 15 the device state can be determined based not only on the power source phase but also on the boost ratio. However, the boost ratio changes irrespective of the power source phase, such as when the load voltage command value is changed or when the rectified voltage value fluctuates due to fluctuations in power source voltage.

When the boost ratio changes in response to the change in load voltage command value, if the boost ratio increases, the on-duty of the short-circuit device 4 increases to increase the ripple of the reactor current, with the result that $Idc\_0(n)$ reduces to reduce the recovery current flowing through the backflow preventing element 5. On the other hand, if the boost ratio reduces, the on-duty of the short-circuit device 4 reduces to reduce the ripple of the reactor current, with the result that $Idc\_0(n)$ increases to increase the recovery current flowing through the backflow preventing element 5. Thus, the relationship between the boost ratio and the recovery current changes with the same tendency as in the case described with reference to FIG. 13, FIG. 14, and FIG. 15.

On the other hand, when the boost ratio changes in response to the fluctuations in power source voltage, if the boost ratio increases, the on-duty of the short-circuit device 4 increases to increase the ripple of the reactor current, but the average value of the reactor current increases to maintain the same electric power to be output to the load 9. Accordingly, as a result, $Idc\_0(n)$ increases to increase the recovery current flowing through the backflow preventing element 5. On the other hand, if the boost ratio reduces, the on-duty of the short-circuit device 4 reduces to reduce the ripple of the reactor current, but the average value of the reactor current reduces to maintain the same electric power to be output to the load 9. Accordingly, $Idc\_0(n)$ reduces to reduce the recovery current flowing through the backflow preventing element 5. Thus, the relationship between the boost ratio and the recovery current changes with a tendency opposite to that in the case described with reference to FIG. 13, FIG. 14, and FIG. 15.

The margin may be set in consideration of the fact that the boost ratio, the power source phase (2f for a single-phase power source, 6f for a three-phase power source) when the AC power source is used, the fluctuations in power source voltage, and other parameters differ as described above. Further, the margin a may be changed depending on the operation conditions of the device.

The controller 100 transmits the commutation drive signal having the thus determined pulse width TD2 to the commutation device 7, to thereby control the commutation device 7 to perform the commutation operation.

As described above, according to the system in this embodiment, the reactor current and other parameters are calculated to calculate the minimum width of the commutation pulse width TD1, and the commutation drive signal is transmitted correspondingly to the minimum width, to thereby control the commutation device 7 to perform the commutation operation. Consequently, the time period for performing the commutation operation can be reduced as much as possible, and the electric power relating to the commutation operation not contributing to power conversion can be reduced to save the energy.

Embodiment 2

Figure 16:
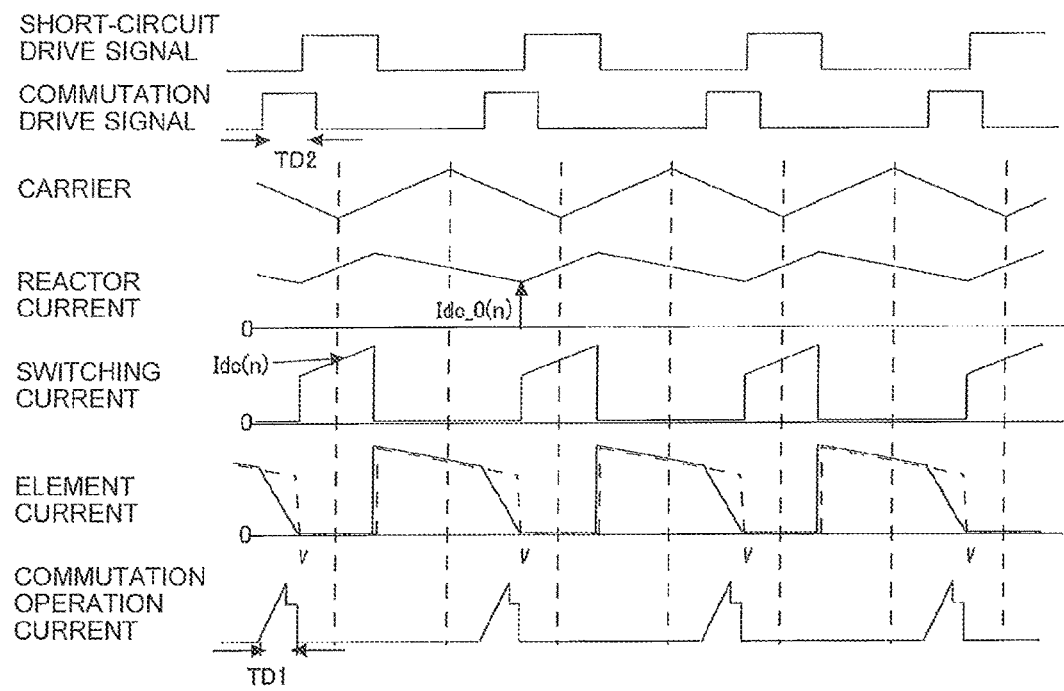
FIG. 16 is a diagram illustrating the waveforms of signals and currents at the time when the commutation device 7 is operated according to Embodiment 2 of the present invention.

FIG. 16 is a diagram illustrating another example of the waveforms of signals and currents at the time when the commutation device 7 is operated according to Embodiment 2 of the present invention. In Embodiment 1 described above, to calculate the minimum value of the commutation pulse width TD1, the current (reactor current) $Idc\_0(n)$ flowing through the reactor 3 is calculated as the current with which the current flowing through the backflow preventing element 5 in the commutation operation can be detected or estimated. In this embodiment, the reactor current $Idc\_0(n)$ is calculated based on the short-circuit current (switching current) flowing through the short-circuit device 4.

As illustrated in FIG. 16, in the period during which the short-circuit device 4 is on, the switching current increases linearly with an inclination $ka=Vs/L$ similarly to the reactor current. Further, in the period during which the short-circuit device 4 is off, the switching current is zero (does not flow).

Thus, for example, when the controller 100 acquires the switching current as the current detection value $Idc(n)$ in synchronization with the valley of the carrier signal, $Idc\_0(n)$ can be calculated based on Expression (1).

As described above, according to the system in Embodiment 2, the controller 100 can calculate the reactor current $Idc\_0(n)$ based on the switching current flowing through the short-circuit device 4 in the period during which the short-circuit device 4 is on.

Embodiment 3

Figure 17:
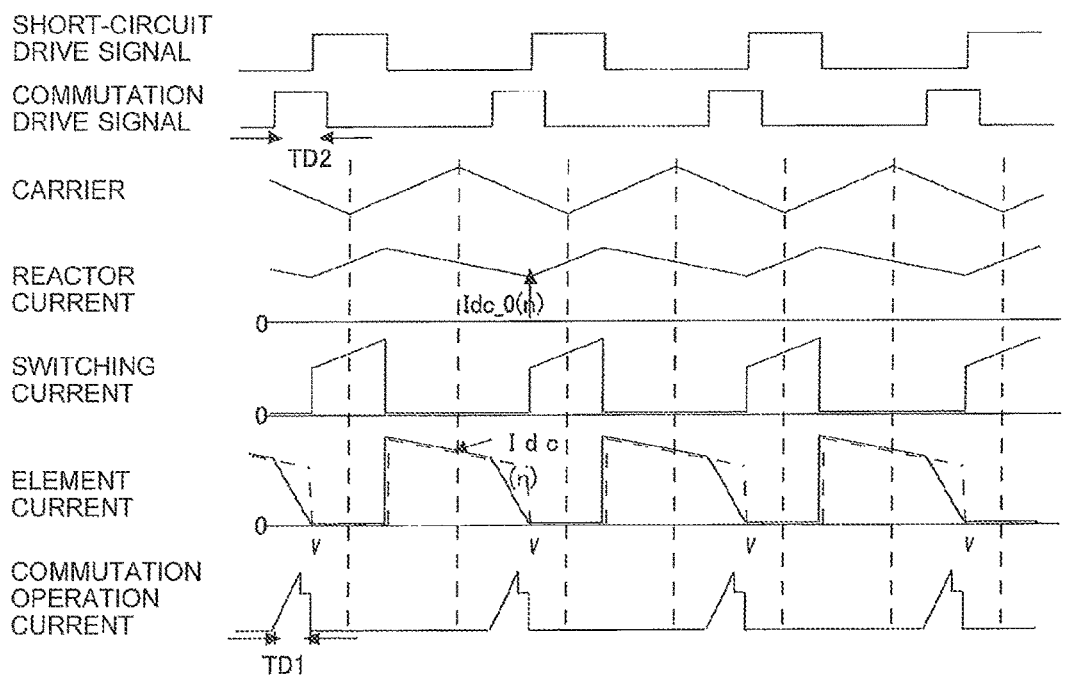
FIG. 17 is a diagram illustrating the waveforms of signals and currents at the time when the commutation device 7 is operated according to Embodiment 3 of the present invention.

FIG. 17 is a diagram illustrating another example of the waveforms of signals and currents at the time when the commutation device 7 is operated according to Embodiment 3 of the present invention. In this embodiment, the reactor current $Idc\_0(n)$ is calculated based on the current (element current) flowing through the backflow preventing element 5 in the commutation operation. As illustrated in FIG. 17, in the period during which the short-circuit device 4 is on, the element current is zero (does not flow). In the period during which the short-circuit device 4 is off, the element current decreases linearly with an inclination $kb=(Vs-Vdc)/L$.

Thus, for example, when the controller 100 acquires the switching current as the current detection value $Idc(n)$ in synchronization with the peak of the carrier signal, $Idc\_0(n)$ can be calculated based on Expression (2).

As described above, according to the system in Embodiment 3, the controller 100 can calculate the reactor current $Idc\_0(n)$ based on the element current flowing through the backflow preventing element 5 at the time of commutation operation in the period during which the short-circuit device 4 is off.

Embodiment 4

Figure 18:
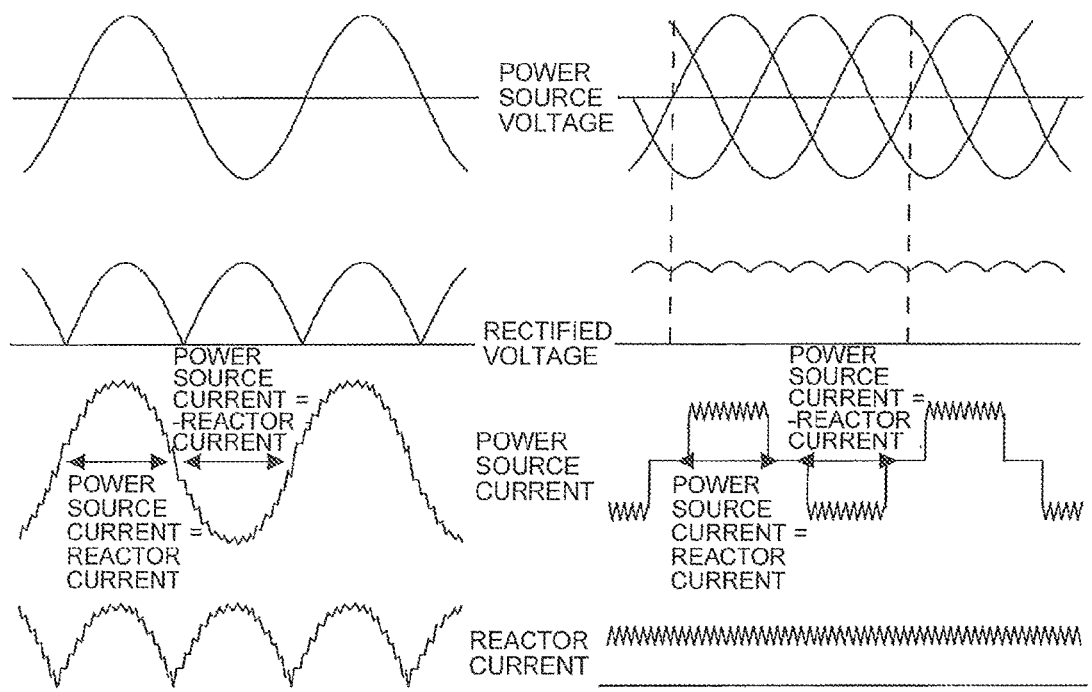
FIG. 18 is a diagram illustrating the waveforms of signals and currents at the time when the commutation device 7 is operated according to Embodiment 4 of the present invention.

FIG. 18 is a diagram illustrating another example of the waveforms of signals and currents at the time when the commutation device 7 is operated according to Embodiment 4 of the present invention. In this embodiment, the reactor current $Idc\_0(n)$ is calculated based on a current (power source current) from the power source 1 formed of a combination of an AC power source and a rectification circuit. As illustrated in FIG. 18, in the period during which the power source current is positive, "power source current=reactor current" is established. On the other hand, in the period during which the power source current is negative, "power source current=–reactor current" is established. Thus, the reactor current can be known based on the power source current, and hence the reactor current $Idc\_0(n)$ can be calculated based on Expression (1) or Expression (2).

Embodiment 5

Although not particularly specified in each of the above-mentioned embodiments, an upper limit value and a lower limit value, which can be determined, may be set for the commutation pulse width TD1 or the pulse width TD2 (time period for performing the commutation operation) determined by calculation, for example. For example, when the recovery loss at the time when the commutation operation is not performed is smaller than the loss (electric power) generated when the commutation operation is performed, it is not necessary to perform the commutation operation. In view of this, such a pulse width that the same loss as the recovery loss at the time when the commutation operation is not performed is generated may be set as the upper limit value. Further, as described above, when the current flowing through the power conversion device is small due to the large boost ratio, the recovery current flowing through the backflow preventing element 5 may be small. In this case, the effect of performing the commutation operation may be small. In addition, the upper limit value and other values may be set so that the current flowing through commutation device 7 may not exceed the current capacity of the element included in the commutation device. When the controller 100 determines that the determined commutation pulse width TD1 or pulse width TD2 (time period for performing the commutation operation) is equal to or larger than the upper limit value, the controller 100 avoids transmitting the pulse of the commutation drive signal. In addition, for example, the lower limit value and other values may be set based on the condition that the recovery current generated in the chopper circuit 6 is minimized.

As described above, the upper limit value and the lower limit value are set so that the commutation operation out of the range specified by the upper limit value and the lower limit value is not performed, and hence in the case where the loss is smaller when the commutation operation is not performed or in other cases, the loss caused by the commutation operation can be reduced. Further, the current can be prevented from flowing excessively, and the elements of the commutation device 7 and others can be protected to enhance the safety. Further, a rectification element having a small current capacity can be used to reduce the cost.

Embodiment 6

In the above-mentioned embodiments, the commutation pulse width TD1 and the pulse width TD2 are calculated each time the commutation operation is performed, but the present invention is not limited thereto. For example, the controller 100 may switch the configuration between the case of calculating the commutation pulse width TD1 and the pulse width TD2 (the case of changing the pulse width) and the case of not calculating the commutation pulse width TD1 and the pulse width TD2 (the case of fixing the pulse width).

For example, when the voltage applied from the power source 1 less fluctuates, or when the load 9 no longer changes but becomes substantially constant, the pulse width may be fixed because the operation of the power conversion device is stable. Further, also when the controller 100 cannot perform the calculation processing for each commutation operation, the pulse width may be fixed. The fixed pulse width can reduce the processing load on the controller 100.

Embodiment 7

Figure 19:
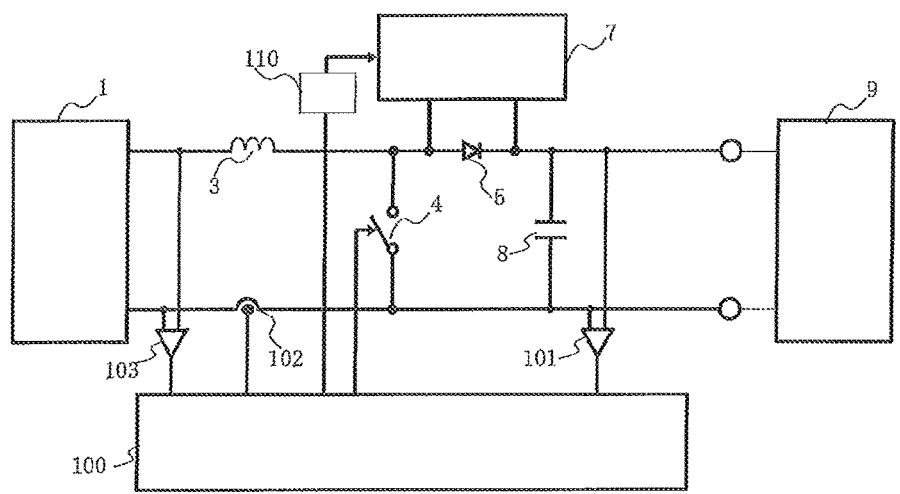
FIG. 19 is a diagram illustrating an example of the configuration of the system and the like mainly including the power conversion device according to Embodiment 7 of the present invention.

FIG. 19 is a diagram illustrating an example of a system configuration and other configurations mainly including a power conversion device according to Embodiment 7 of the present invention. In FIG. 19, the devices and the like denoted by the same reference symbols as those in FIG. 1 perform the same operations, processing, and the like as those described in Embodiment 1.

In FIG. 19, an interruption device 110 is a device for forcibly interrupting the commutation drive signal transmitted from the controller 100. For example, there may be a case where the effect of reducing the recovery current through the commutation operation performed by the commutation device 7 is small. For example, when the load 9 is small, the commutation operation may be continued in the state in which the effect remains small. In such a case, the interruption device 110 determines that the commutation drive signal needs to be interrupted, and interrupts the commutation drive signal.

For example, when the current mode of the reactor 3 is a discontinuous mode or a critical mode, the interruption device 110 may detect the reactor current to determine whether or not to interrupt the commutation drive signal. Further, the interruption device 110 may determine whether or not to interrupt the commutation drive signal based on the magnitude of the load 9. For example, when the power source 1 is a DC power source, the magnitude of the load 9 may be determined based on whether or not the current mode of the reactor 3 is switched from a continuous mode to the discontinuous mode or the critical mode. Further, a load with which the ratio of the continuous mode to the discontinuous mode or the critical mode in the current mode of the reactor 3 exceeds an arbitrary value may be stored in a storage device or other devices, and the interruption device 110 may determine whether or not to interrupt the commutation drive signal based on the stored load.

As described above, the interruption device 110 is connected, and hence an unnecessary commutation operation can be prevented from being performed. In this embodiment, the interruption device 110 is connected independently of the controller 100, but the controller 100 may perform the processing of the interruption device 110 instead.

Embodiment 8

In the above-mentioned embodiments, a description has been given of the power conversion device in which the chopper circuit 6 that performs boosting is subjected to the commutation by the commutation device 7 and which performs power conversion by boosting the voltage of the power source 1, but the present invention is not limited thereto. The present invention is applicable even to a power conversion device including a voltage changing device that can perform power conversion by bucking or by boosting and bucking the voltage, for example, instead of boosting the voltage, to supply the changed voltage to the load 9, and the same effects as those described above in each of the embodiments can be exerted therein.

Embodiment 9

FIG. 20 is a configuration diagram of a refrigeration air-conditioning apparatus according to Embodiment 9 of the present invention. In this embodiment, a description is given of a refrigeration air-conditioning apparatus to be supplied with electric power via the above-mentioned power conversion apparatus. The refrigeration air-conditioning apparatus of FIG. 20 includes a heat source-side unit (outdoor unit) 300 and a load-side unit (indoor unit) 400. The heat source-side unit 300 and the load-side unit 400 are coupled to each other via refrigerant pipes, to thereby form a main refrigerant circuit to circulate refrigerant. In the refrigerant pipes, one pipe through which gas refrigerant flows is referred to as "gas pipe 500", and the other pipe through which liquid refrigerant (sometimes, two-phase gas-liquid refrigerant) flows is referred to as "liquid pipe 600".

In this embodiment, the heat source-side unit 300 includes respective devices (means), namely, a compressor 301, an oil separator 302, a four-way valve 303, a heat source-side heat exchanger 304, a heat source-side fan 305, an accumulator 306, a heat source-side expansion device (expansion valve) 307, an intermediate heat exchanger 308, a bypass expansion device 309, and a heat source-side controller 310.

The compressor 301 compresses and discharges the sucked refrigerant. In this case, the compressor 301 can arbitrarily change an operating frequency thereof so that the capacity of the compressor 301 (the amount of refrigerant sent per unit time) can be finely changed. Then, the power conversion device described above in each of the embodiments is mounted between the power source 1 for supplying electric power for driving the compressor 301 (motor) and the compressor 301 and other devices serving as the load 9.

The oil separator 302 separates lubricant oil which is mixed in the refrigerant and discharged from the compressor 301. The separated lubricant oil is returned to the compressor 301. The four-way valve 303 switches the flow of the refrigerant between a cooling operation and a heating operation based on an instruction from the heat source-side controller 310. Further, the heat source-side heat exchanger 304 exchanges heat between the refrigerant and the air (outside air). For example, in the heating operation, the heat source-side heat exchanger 304 functions as an evaporator, and exchanges heat between low-pressure refrigerant flowing into the heat source-side heat exchanger 304 via the heat source-side expansion device 307 and the air, to thereby evaporate and gasify the refrigerant. On the other hand, in the cooling operation, the heat source-side heat exchanger 304 functions as a condenser, and exchanges heat between refrigerant flowing into the heat source-side heat exchanger 304 from the four-way valve 303 side and compressed by the compressor 301 and the air, to thereby condense and liquefy the refrigerant. The heat source-side fan 305 is provided to the heat source-side heat exchanger 304 to efficiently exchange heat between the refrigerant and the air. The heat source-side fan 305 may also be supplied with electric power via the power conversion device described above in each of the embodiments, and, for example, an operating frequency of a fan motor may be arbitrarily changed by an inverter device serving as the load 9 so that the rotation speed of the fan may be finely changed.

The intermediate heat exchanger 308 exchanges heat between refrigerant flowing through a main passage of the refrigerant circuit and refrigerant branching from the passage to have the flow rate adjusted by the bypass expansion device 309 (expansion valve). In particular, when the refrigerant needs to be subcooled in the cooling operation, the intermediate heat exchanger 308 subcools the refrigerant and supplies the subcooled refrigerant to the load-side unit 400. Liquid flowing via the bypass expansion device 309 is returned to the accumulator 306 via a bypass pipe. The accumulator 306 is a unit for storing excess liquid refrigerant, for example. The heat source-side controller 310 is constructed with a microcomputer, for example. Then, the heat source-side controller 310 can communicate to and from the load-side controller 404 through wired or wireless connection, and, for example, based on data relating to detection by various kinds of detection units (sensors) included in the refrigeration air-conditioning apparatus, controls the respective devices (means) of the refrigeration air-conditioning apparatus, such as the control of the operating frequency of the compressor 301 by inverter circuit control, to thereby control the operation of the overall refrigeration air-conditioning apparatus. Further, the processing performed by the controller 100 described above in each of the embodiments may be performed by the heat source-side controller 310.

Besides, the load-side unit 400 includes a load-side heat exchanger 401, a load-side expansion device (expansion valve) 402, a load-side fan 403, and a load-side controller 404. The load-side heat exchanger 401 exchanges heat between the refrigerant and the air. For example, in the heating operation, the load-side heat exchanger 401 functions as a condenser, and exchanges heat between refrigerant flowing into the load-side heat exchanger 401 from the gas pipe 500 and the air, to thereby condense and liquefy the refrigerant (or turn the refrigerant into two-phase gas-liquid state), and discharges the refrigerant to the liquid pipe 600 side. On the other hand, in the cooling operation, the load-side heat exchanger 401 functions as an evaporator, and exchanges heat between refrigerant reduced in pressure by the load-side expansion device 402 and the air, to thereby cause the refrigerant to receive the heat of the air to evaporate and gasify the refrigerant, and discharge the refrigerant to the gas pipe 500 side. Further, the load-side fan 403 for adjusting the flow of the air subjected to heat exchange is provided to the load-side unit 400. The operating speed of the load-side fan 403 is determined based on user's setting, for example. The load-side expansion device 402 is provided to regulate the pressure of the refrigerant in the load-side heat exchanger 401 by being changed in opening degree.

Further, the load-side controller 404 is also constructed with a microcomputer, and can communicate to and from the heat source-side controller 310 through wired or wireless communication, for example. The load-side controller 404 controls the respective devices (means) of the load-side unit 400 based on an instruction from the heat source-side controller 310 or an instruction from a resident so that, for example, the indoor space may have a predetermined temperature. Further, the load-side controller 404 transmits a signal including data relating to detection by a detection unit provided to the load-side unit 400.

As described above, in the refrigeration air-conditioning apparatus according to Embodiment 9, the power conversion device including the backflow preventing device according to each of the above-mentioned embodiments is used to supply electric power to the compressor 301, the heat source-side fan 305, and other devices. Consequently, the highly efficient, highly reliable, and power saving refrigeration air-conditioning apparatus can be obtained.

INDUSTRIAL APPLICABILITY

In Embodiment 9 described above, a description has been given of the case where the power conversion device according to the present invention is applied to a refrigeration air-conditioning apparatus, but the present invention is not limited thereto. The power conversion device according to the present invention is applicable also to a heat pump apparatus, an apparatus using a refrigeration cycle (heat pump cycle) such as a refrigerator, a conveyance apparatus such as an elevator, and a lighting apparatus (system).

REFERENCE SIGNS LIST 1 power source 1A DC power source 1B single-phase AC power source 1C three-phase AC power source 2B, 2C rectification circuit 2a, 2b, 2c, 2d rectification element 3 reactor 4 short-circuit device 5 backflow preventing element 6 chopper circuit 7 commutation device 71 transformer 72 commutation rectification element 73 transformer drive circuit 74 commutation switch 75 commutation power source 8 smoothing device
9 load 100 controller 100A on-duty calculation unit 100B drive signal generation unit 101 voltage detection unit 102 current detection unit
103 power source voltage detection unit 105 inter-terminal voltage detection unit 110 interruption device 300 heat source-side unit 301 compressor 302 oil separator 303 four-way valve 304 heat source-side heat exchanger 305 heat source-side fan 306 accumulator 307 heat source-side expansion device 308 intermediate heat exchanger 309 bypass expansion device 310 heat source-side controller 400 load-side unit
401 load-side heat exchanger 402 load-side expansion device 403 load-side fan 404 load-side controller 500 gas pipe 600 liquid pipe

The invention claimed is:

1. A backflow preventing device, comprising:
a backflow preventing element connected between a power source and a load, for preventing a backflow of a current from the load side to the power source side;
a commutation device configured to perform a commutation operation of causing a current to flow through an other path connected in parallel to the backflow preventing element;
a voltage detector installed between the power source and the load at a position at which a voltage applied to the backflow preventing element is detectable or estimatable; and
a controller configured to generate a drive signal for performing the commutation operation, and control the commutation device to perform the commutation operation based on the drive signal,
wherein the controller is configured to determine a time period for controlling the commutation device to perform the commutation operation based on a voltage relating to detection by the voltage detector, and transmit the commutation drive signal based on the determined time period to the commutation device.

2. The backflow preventing device of claim 1, wherein the controller is configured to transmit the commutation drive signal having a pulse width determined based on the determined time period to the commutation device.

3. The backflow preventing device of claim 1, further comprising a current detector connected between the power source and the load at a position at which a current flowing through the backflow preventing element is detectable or estimatable.

4. The backflow preventing device of claim 3,
wherein the power source includes an AC power source and a rectification device, and
wherein the current detector is connected on a path of a current flowing from the power source.

5. The backflow preventing device of claim 1, wherein the controller is configured to determine the time period based on a voltage applied to the backflow preventing element.

6. The backflow preventing device of claim 1, wherein the voltage detector includes one of the voltage detector configured to detect a voltage across the backflow preventing element and the voltage detector configured to detect a voltage output from a chopper circuit including a reactor, a switching element, and the backflow preventing element.

7. The backflow preventing device of claim 1, wherein the controller is configured to determine the time period based on a current increase rate in the commutation operation of the commutation device.

8. The backflow preventing device of claim 7, wherein the current increase rate has a value set in advance.

9. The backflow preventing device of claim 8,
wherein the commutation device includes a transformer configured to apply a voltage that is induced by a current flowing through a primary-side winding of the transformer, to a secondary-side winding of the transformer on an other path, and
wherein the current increase rate is set based on a value that is based on an inductance component of the transformer.

10. The backflow preventing device of claim 2, wherein at least one of an upper limit value and a lower limit value of the time period to be determined is set.

11. The backflow preventing device of claim 1, wherein the controller is configured to switch whether to fix or change the time period for performing the commutation operation.

12. The backflow preventing device of claim 11, wherein the controller is configured to perform the switching based on a voltage change amount of the power source or a load.

13. The backflow preventing device of claim 2, further comprising an interruption device configured to interrupt the commutation drive signal.

14. A power conversion device, comprising the backflow preventing device of claim 1,
wherein the power conversion device is configured to convert electric power from a power source to a load.

15. A refrigeration air-conditioning apparatus, comprising the power conversion device of claim 14 configured to drive at least one of a compressor and an air-sending device.

* * * * *